Oct. 26, 1943.    J. T. MARVIN ET AL    2,332,737
COMPOSITE METAL ARTICLE
Filed July 23, 1940

JOHN T. MARVIN
ARTHUR R. SHAW
INVENTORS

Patented Oct. 26, 1943

2,332,737

UNITED STATES PATENT OFFICE 2,332,737

COMPOSITE METAL ARTICLE

John T. Marvin and Arthur R. Shaw, Dayton, Ohio, assignors to General Motors Corporation, Detroit, Mich., a corporation of Delaware Application July 23, 1940, Serial No. 346,980

3 Claims. (Cl. 29—181)

This invention relates to machine elements and is particularly concerned with friction elements which include porous metal friction facings thereon.

An object of the invention is to provide the friction element of the composite type wherein the supporting member thereof is formed from sintered porous ferrous material and wherein the friction surface thereon is formed from sintered porous cuprous material.

A further object of the invention is to provide a friction element which may be fabricated in a substantially flat condition and which includes a porous cuprous friction facing thereon.

Further objects and advantages of the present invention will be apparent from the following description, reference being had to the accompanying drawing wherein preferred embodiments of the present invention is clearly shown.

In recent years articles used as clutches, brakes, etc., have been formed to include a friction facing thereon made from sintered porous metal. Friction facings of this type are particularly advantageous since they outlast the usual type of fabric facings many times and, due to the possibility of including various ingredients therein during the manufacture thereof, such facings can be varied as to the coefficient of the friction thereof to any desired figure within wide limits. Friction articles of this general type are disclosed in the Davis Patent No. 2,199,620 and assigned to the assignee of this application. In this patent, facings made from porous sintered bronze are disclosed. The aforementioned patent proposes to rivet these porous friction facings to a steel supporting member and thereby give support to the porous facing members to permit its use under varying conditions. It has been found that when porous bronze material, for example, is riveted to a stronger material, that there is a tendency when heavy loads are imposed thereon for the bronze to fail and tear away and in some instances this condition is quite serious. In the Short Reissue Patent No. Re. 21,495 also assigned to the assignee of this invention, disclosure is made wherein the porous bronze facing is bonded directly to a steel supporting member whereby riveting is eliminated and much difficulty is likewise eliminated under certain applications of the article.

When bonding large areas of porous bronze, for example, to a steel supporting element considerable difficulty is experienced in providing a substantially flat supporting element. Thus, when making clutch plates of substantial diameters, it is difficult to hold the steel flat during the bonding of the bronze facing thereto due to the tendency of the steel to warp under high temperature conditions imposed thereon. This tendency necessitates the use of special types of furnaces for sintering and bonding and other expedients to prevent warpage of the steel. Prevention of warpage is very important since when warpage does occur in the steel member, unsatisfactory bonding is experienced between the steel and the bronze, thus causing failure in some cases of the clutch due to the fact that the friction facing is only bonded to the supporting member in a few isolated areas.

Figure 1:
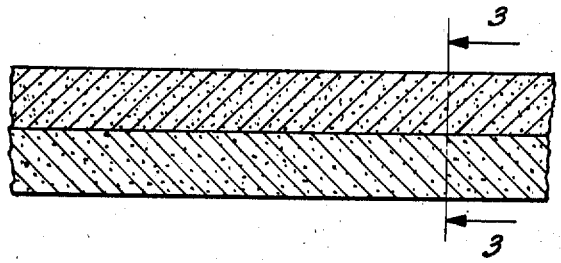
Fig. 1 illustrates a fragmentary sectional view of a machine element showing a porous ferrous supporting member having a cuprous friction facing bonded thereto.
Figure 2:
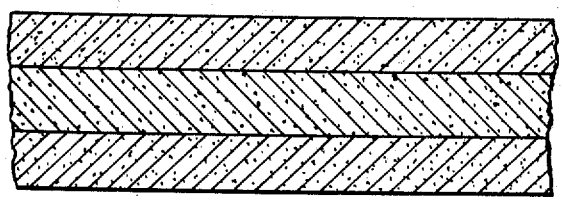
Fig. 2 is a view similar to Fig. 1 wherein friction facings are provided on both sides of the ferrous supporting member.
Figure 3:
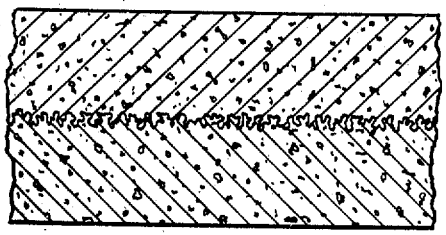
Fig. 3 is a fragmentary magnified view showing a cross section of the material at the mutually contacting surfaces of the supporting member and friction facing of an article, as shown in Fig. 1.

Our invention is particularly directed to an article wherein a porous ferrous supporting member is utilized which may be inexpensively fabricated from powdered iron, etc., and which may be made substantially flat and if any warpage does occur, may be readily flattened in a press. A further advantage of a porous supporting member lies in the fact that when the powdered bronze-forming powders of the clutch facing are briquetted thereon, small portions of the bronze-forming powder are forced into the pores at the surface of the ferrous metal (as shown in Fig. 3) which portion upon sintering, act as mechanical interlocking means to supplement the metallurgical bond between the bronze and the iron. Furthermore, these interlocked portions prevent separation of the supporting members from the friction facing even if some warpage does occur during sintering thereby assuring a complete bond throughout the mutually contacting surface of the two members.

Porous iron supporting members may be fabricated by briquetting iron powder such as sponge iron, electrolytic iron, comminuted iron etc., under pressures of from 25,000 to 75,000 pounds per square inch, which iron may include small quantities of graphite. The iron powder is sintered under non-oxidizing conditions at temperatures preferably ranging from 1900 to 2100° F. for a period ranging from 10 minutes to 45 minutes, whereupon a porous iron plate formed which is cooled under suitable conditions and presents a strong member having a degree of porosity as described hereinafter. If the load condition imposed upon the element under service applications are extremely high, the iron may include alloying ingredients therein which increase the strength thereof, for example, nickel, cobalt, manganese, copper or any other suitable alloy ingredient in quantities preferably not exceeding 10% and preferably between 2 and 5% by weight. Likewise, phosphorus may be utilized in quantities below 2½% as disclosed in application Serial No. 306,703, assigned to the assignee of the present invention, which addition has been found to increase the strength of the iron as well as improve the ductility thereof. This sintered ferrous plate is next placed in a die and a suitable quantity of bronze forming powders is placed thereon in accordance with the desired thickness of the friction facing required. These powders may include copper, tin, lead and graphite together with some frictional material such as silica, alundum, mica or asbestos and also small quantities of iron may be added if desired to the bronze forming powders. A bronze including, copper and tin and any one or combination of the other ingredients in th ranges noted may be used, for example:

| | Parts |
|---|---|
| Copper | Between 75 and 90 |
| Tin | Between 25 and 10 |
| Lead | Between 2 and 15 |
| Graphite | Between 1 to 8 |
| Iron | Between 2 to 8 |
| Zinc | Between 2 to 8 |

Preferably we have found that a friction facing including:

| | Parts |
|---|---|
| Copper | 78 to 82 |
| Tin | 9 to 11 |
| Lead | 9 to 11 |
| Graphite | 4 to 7 | presents a suitable facing for clutch use. These powders are briquetted under suitable pressures directly upon the porous ferrous supporting member in a layer of desired thickness and then the backing member together with the powder layer thereon is placed in a sintering furnace where the facing member is sintered under non-oxidizing conditions at temperatures ranging between 1400 and 1900° F. for a period of time ranging from 10 to 45 minutes. During this sintering period the tin and copper alloy to form a bronze and simultaneously the porous facing bonds throughout its contacting surface to the ferrous backing member. The lead and graphite have little alloying affinity for the remainder of the layer and therefore remain substantially dispersed therethrough. The briquetting operation forces a portion of the bronze-forming powder into the surface pores of the porous ferrous member and during sintering these interlocking portions bond to the ferrous member and likewise upon the formation the bronze becomes strong and act as mechanical interlocks to assist in holding the bronze layer to the ferrous member in addition to the metallurgical bond which is provided therebetween. In most cases, if a strong mechanical interlock is desired in addition to the metallurgical bond, it is preferable to use metal powders having varying mesh sizes. Thus, it is preferable to use iron powder of a mesh size from 80 to 100 mesh in the ferrous supporting member, whereas the bronze layer should be formed from powder having a mesh size in the order of from 200 to 325 mesh. In this manner, the ferrous layer is of sufficient porosity to permit appreciable impregnation by the finer bronze forming powders. This variation in grain size is obviously not entirely necessary since even if similar size powders are used in both layers some interlocking is obtained but by changing the mesh size powder, as herein discussed, it is possible to increase the interlocking effect when desired. Also, to facilitate impregnation it is desirable in some cases to utilize pressures at the lower end of the range when briquetting the iron and at the higher end of the range when briquetting the bronze. Obviously, such expedients are best decided upon after trials to determine suitable material for the particular use contemplated since the strength of the ferrous support is often of importance and the strength is dependent upon the method of manufacture.

If desired, porous facings may be provided at both sides of the ferrous member by the simple expedient of first filling bronze forming powder into the die and placing the ferrous member thereon and providing pressure to briquette the bronze forming powders into a layer after which the plunger is removed from the die and additional powder is placed on top of the ferrous member and briquetted thereto. In this manner briquetted layers of bronze-forming powders are disposed at both sides of the ferrous member. Briquetting pressures for the bronze may vary between 20,000 and 75,000 pounds per square inch, although it is obvious that in all cases the briquetting pressure is determined by the degree of strength required together with the desired porosity of the layers. Pressures in the neighborhood of 20,000 to 60,000 pounds per square inch appear to yield highly successful results. Other means of briquetting may be used as are well known in the art, the foregoing being but one method of providing facings at both sides of a support.

Instead of utilizing mixtures of tin and copper powder, it is also possible to utilize alloy powders wherein the copper and tin are previously partially alloyed and wherein each particle consists of a bronze which may be mixed with the other ingredients before or after the formation thereof. In any case, it is to be understood that this deviation is fully within the scope of our invention, the only limitation being that the final friction layer consists of a material predominating in copper.

After the friction articles with the cuprous layer bonded to the ferrous support are removed from the furnace they may be cold pressed, if desired, to insure flatness or they may be hot pressed to increase the strength thereof, either expedient being well known in the art.

In order to facilitate the bonding of the friction layer to the ferrous support it may be desirable to include fluxing ingredients in the cuprous powder layers, such ingredients may be selected from the class including, ammonium chloride, zinc chloride, small quantities of resin, etc. However, in most cases this expedient is entirely unnecessary due to the fluxing nature of the sintering atmosphere which may vary from pure hydrogen to a mixture of nitrogen, carbon monoxide and hydrogen, etc. One suitable atmosphere which is inexpensive and desirable consists of incompletely burned natural gas. In each case where the non-oxidizing atmosphere has a reducing reaction on oxides, it is apparent that the atmosphere acts as a flux and tends to clean the surface of the ferrous backing. Atmospheres for sintering are well known and form no part of this invention.

While the discussion has been directed primarily to clutch plates similar procedures may be utilized to manufacture friction articles such as brakes. Furthermore, it is manifest that the scope of the invention is not limited to clutches alone but embraces all types of machine elements used for rubbing action with another surface. However, in most cases where the article fabricated has a relatively small area, it is unnecessary to use porous ferrous supporting members since conventional types of steel, etc., may be used for this purpose.

What is claimed is as follows:

1. A laminated machine element consisting of a substantially flat support formed from compressed porous ferrous material having a metallic layer formed from compressed porous cuprous material bonded thereto and having portions thereof extending into the pores of the ferrous support.

2. A laminated friction element consisting of a substantially flat compressed porous ferrous supporting member having bonded thereto a facing of compressed porous cuprous material, said cuprous material being integrally secured to said porous ferrous supporting member by an alloy bond effected throughout the mutually contiguous surfaces of said supporting member and said facing.

3. A new article of manufacture comprising a laminated friction element consisting of a substantially flat compressed porous sintered supporting member including above 80% iron, a compressed porous cuprous friction facing including above 70% copper, said facing being metallurgically bonded to said supporting member substantially throughout their mutually contacting surfaces and including portions thereof extending into the pores of the supporting member.

JOHN T. MARVIN.
ARTHUR R. SHAW.